United States Patent
Yao

(10) Patent No.: US 12,463,962 B2
(45) Date of Patent: Nov. 4, 2025

(54) MULTIWORKFLOW AUTHORIZATION SYSTEM AND METHOD

(71) Applicant: Schlumberger Technology Corporation, Sugar Land, TX (US)

(72) Inventor: Yaozong Yao, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 195 days.

(21) Appl. No.: 18/259,450

(22) PCT Filed: Dec. 22, 2021

(86) PCT No.: PCT/US2021/064799
§ 371 (c)(1),
(2) Date: Jun. 27, 2023

(87) PCT Pub. No.: WO2022/146811
PCT Pub. Date: Jul. 7, 2022

(65) Prior Publication Data
US 2024/0380748 A1    Nov. 14, 2024

Related U.S. Application Data

(60) Provisional application No. 63/132,769, filed on Dec. 31, 2020.

(51) Int. Cl.
*H04L 29/06* (2006.01)
*H04L 9/40* (2022.01)

(52) U.S. Cl.
CPC ................. *H04L 63/083* (2013.01)

(58) Field of Classification Search
CPC .................................. H04L 63/083
See application file for complete search history.

(56) References Cited

U.S. PATENT DOCUMENTS

| | | | |
|---|---|---|---|
| 9,043,886 B2 | 5/2015 | Srinivasan et al. | |
| 10,878,079 B2 | 12/2020 | Vepa et al. | |
| 2013/0086657 A1* | 4/2013 | Srinivasan ............ | H04L 9/3234 726/6 |
| 2016/0088022 A1 | 3/2016 | Handa et al. | |

(Continued)

OTHER PUBLICATIONS

Search Report and Written Opinion of International Patent Application No. PCT/US2021/064799 dated Mar. 8, 2022, 15 pages.

(Continued)

*Primary Examiner* — Wasika Nipa
(74) *Attorney, Agent, or Firm* — Jeffrey D. Frantz

(57) ABSTRACT

A central authorization system comprising i) a plurality of application programming interfaces that receive authorization requests from a plurality of frameworks that execute workflows and ii) an authorization policy server. The authorization policy server receives from a first framework a first authorization request for access to a service by a first workflow, the first authorization request comprising a first token associated with the first workflow. The authorization policy server receives from a second framework a second authorization request for access to the service by a second workflow, the second authorization request including the first token. The authorization policy server determines whether the first token provides for authorizing access to the service by the second framework.

10 Claims, 8 Drawing Sheets

(56) References Cited

U.S. PATENT DOCUMENTS

| | | |
|---|---|---|
| 2016/0373455 A1 | 12/2016 | Shokhrin et al. |
| 2017/0329957 A1* | 11/2017 | Vepa .................... G06F 21/445 |
| 2018/0351958 A1 | 12/2018 | Sakurai |
| 2020/0252388 A1 | 8/2020 | Tran et al. |

OTHER PUBLICATIONS

Extended Search Report issued in European Patent Application No. 21916245.0 dated Nov. 7, 2024, 10 pages.

Hardt, D. et al., "The OAuth 2.0 Authorization Framework; rfc6749. txt", Engineering Task Force, IETF, Standard, Internet Society (ISOC) 4, rue Des Falaises CH—1205 Geneva, Switzerland, 2012, pp. 1-76.

"Method to delegate OAuth2 resource authorization to agents of authorized application clients ED—Darl Kuhn", ip.com, ip.com., West Henrietta, NY, US, May 29, 2014, XP013163737, ISSN: 1533-0001, 3 pages.

* cited by examiner

MULTIWORKFLOW AUTHORIZATION SYSTEM AND METHOD

CROSS-REFERENCE TO RELATED APPLICATION

This application is a National Stage Entry of International Application No. PCT/US2021/064799, filed Dec. 22, 2021, which claims benefit under 35 U.S.C. § 119 (e) to U.S. Provisional Patent Application Ser. No. 63/132,769, filed on Dec. 31, 2020, having the same inventors, and entitled "MULTIWORKFLOW AUTHORIZATION SYSTEM." U.S. Provisional Patent Application Ser. No. 63/132,769 is incorporated herein by reference in its entirety.

BACKGROUND

With conventional systems, a user seeking to launch a web service from an application executing on a virtual machine is required to provide detailed configuration and/or security information to the web service and/or various security layers. In order to maintain a security boundary within a workflow, an authentication token is issued only to the workflow that requested it. So, when workflow A wants to access workflow B, workflow A must request another token targeted to workflow B. This is normally done by redirecting a user browser to workflow B and logging in to workflow B. Then workflow B redirects the user browser back to workflow A to continue. This procedure is complex and requires the collaboration between both workflow A and workflow B.

In a representational state transfer (REST) application programming interface (API) scenario, there is no browser to be redirected. In this case, the procedure described above cannot be used. In most cases of a REST API, a service account is used when workflow A calls workflow B and workflow B is needed to act on a user's behalf. A user token is passed along as well. Workflow A needs to store the credentials for that service account and switch to that credential when calling workflow B. Workflow B needs to maintain records of which service accounts are trusted and which are not. If there are hundreds of workflows that need to call workflow B, then workflow B needs to maintain a long list and that requires updating.

SUMMARY

Multiworkflow authorization system and method include an authorization policy server receiving, from a first framework, a first authorization request for access to a service by a first workflow. The first authorization request includes a first token associated with the first workflow. In response to the first authorization request, access of the first framework associated with the first workflow is authorized. The authorization policy server further receives, from a second framework, a second authorization request for access to the service by a second workflow, the second authorization request including the first token. In response to the second authorization request, determining whether the first token provides for authorizing access to the service by the second framework.

BRIEF DESCRIPTION OF DRAWINGS

Features and advantages of the described implementations can be more readily understood by reference to the following description taken in conjunction with the accompanying drawings. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure describes a central authorization server that manages the trust relationships between workflows. It is a challenge to have a generic authorization component because each workflow may manage the authorization model in different ways. The disclosed central authorization server is flexible and extensible to accommodate these challenges.

Example embodiments in which the disclosed central authorization server may be implemented include energy production environments, among others. By way of example, the central authorization server may be implemented in a secure, cloud-based system that is used in an oil exploration and production (E&P) environment. As another example, the disclosed central authorization server may be implemented in a secure, cloud-based system that provides access to users and workflows in a solar energy production environment or a wind energy production environment.

As used herein, a "framework" or "software framework" is a concrete or a conceptual platform where common code with generic functionality can be selectively specialized or overridden by developers or users. Framework may take the form of libraries, where a well-defined application program interface (API) is reusable anywhere within the software under development. The term, framework, corresponds to the standard definition used in the art.

The purpose of a software framework is to simplify the development environment, allowing developers to dedicate their efforts to the project requirements, rather than dealing with the framework's mundane, repetitive functions and libraries. For example, rather than creating a VoIP application from scratch, a developer using a prepared framework can concentrate on adding user-friendly buttons and menus, or integrating VoIP with other functions.

Figure 1:
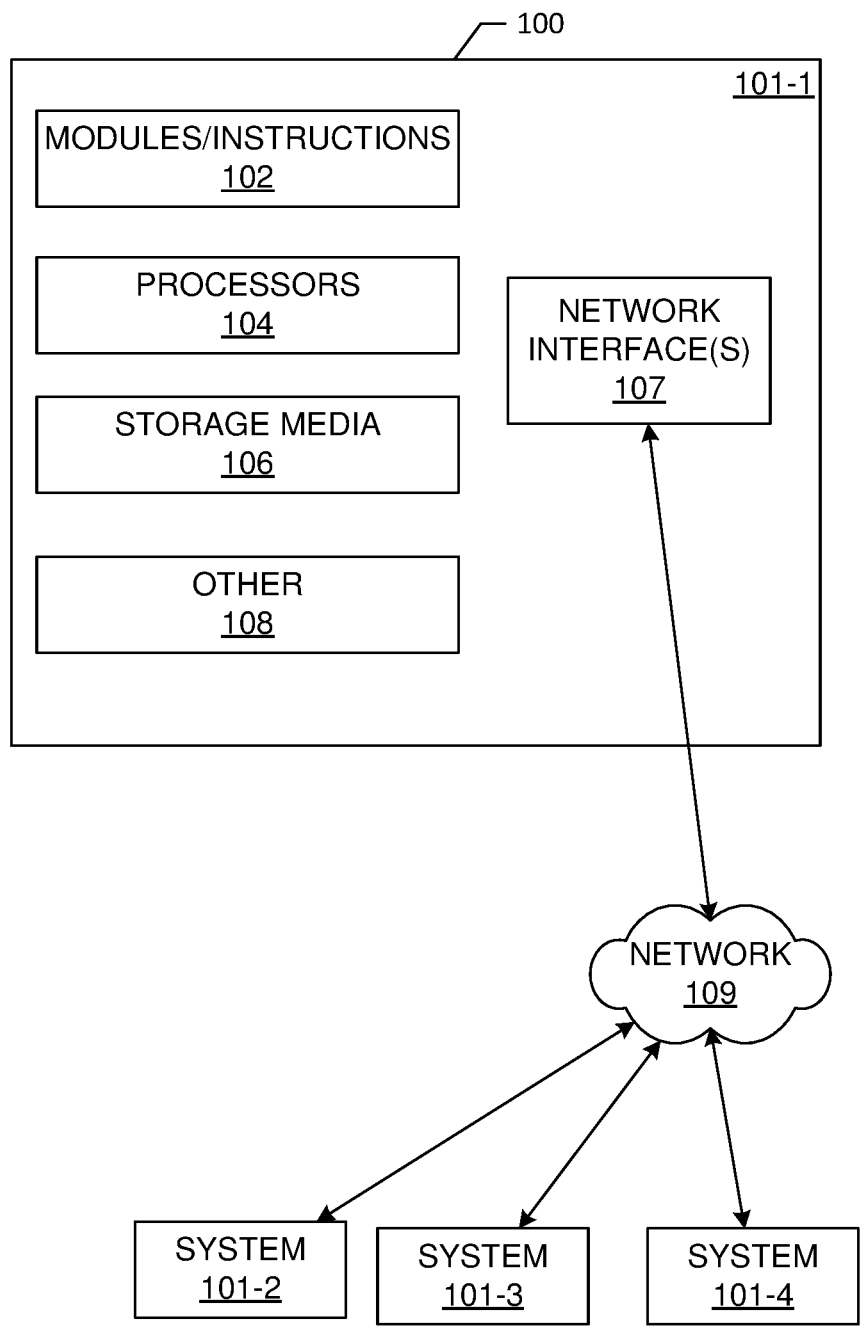
FIG. 1 shows examples of a system that can include one or more computing systems, which may be operatively coupled via one or more networks.

FIG. 1 shows an example of a system 100 that can include one or more computing systems 101-1, 101-2, 101-3 and 101-4, which may be operatively coupled via one or more networks 109, which may include wired networks or wireless networks, or both. As an example, a system can include an individual computer system or an arrangement of distributed computer systems. In the example of FIG. 1, the computer system 101-1 can include one or more modules 102, which may be or include processor-executable instructions, for example, executable to perform various tasks (e.g., receiving information, requesting information, processing information, simulation, outputting information, etc.).

A module may be executed independently or in coordination with one or more processors 104, which may be operatively coupled to one or more storage media 106 (e.g., via wire, wirelessly, etc.). As an example, one or more of the one or more processors 104 can be operatively coupled to at least one of one or more network interface 107. In such an example, the computer system 101-1 can transmit and/or receive information, for example, via the one or more networks 109 (e.g., the Internet, a private network, a cellular network, a satellite network, etc.).

As an example, the computer system 101-1 may receive from and/or transmit information to one or more other devices, which may be or include, for example, one or more of the computer systems 101-2, 101-3, 101-4, etc. A device may be located in a physical location that differs from that of the computer system 101-1. As an example, a location may be, for example, a processing facility location, a data center location (e.g., server farm, etc.), an oil rig location, a wellsite location, a downhole location, etc.

A processor 104 may be or include a microprocessor, microcontroller, processor module or subsystem, programmable integrated circuit, programmable gate array, or another control or computing device. The storage media 106 may be implemented as one or more computer-readable or machine-readable storage media. As an example, storage may be distributed within and/or across multiple internal and/or external enclosures of a computing system and/or additional computing systems.

As an example, a storage medium 106 or storage media 106 may include one or more different forms of memory, including semiconductor memory devices, such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices. A storage medium or media may be located in a machine running machine-readable instructions or located at a remote site from which machine-readable instructions may be downloaded over a network for execution.

Various components of a system such as, for example, a computer system, may be implemented in hardware, software, or a combination of both hardware and software (e.g., including firmware), including one or more signal processing and/or application specific integrated circuits. As an example, a system may include a processing apparatus that may be or include a general purpose processors or application specific chips (e.g., or chipsets), such as ASICs, FPGAs, PLDs, or other appropriate devices.

Figure 2:
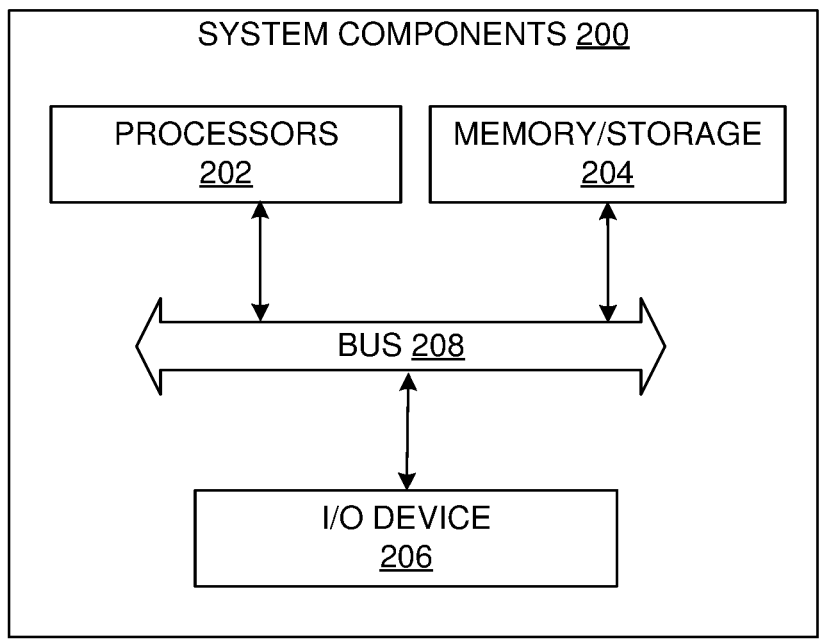
FIG. 2 shows components of an example computing system and an example networked system with a network.
Figure 2:
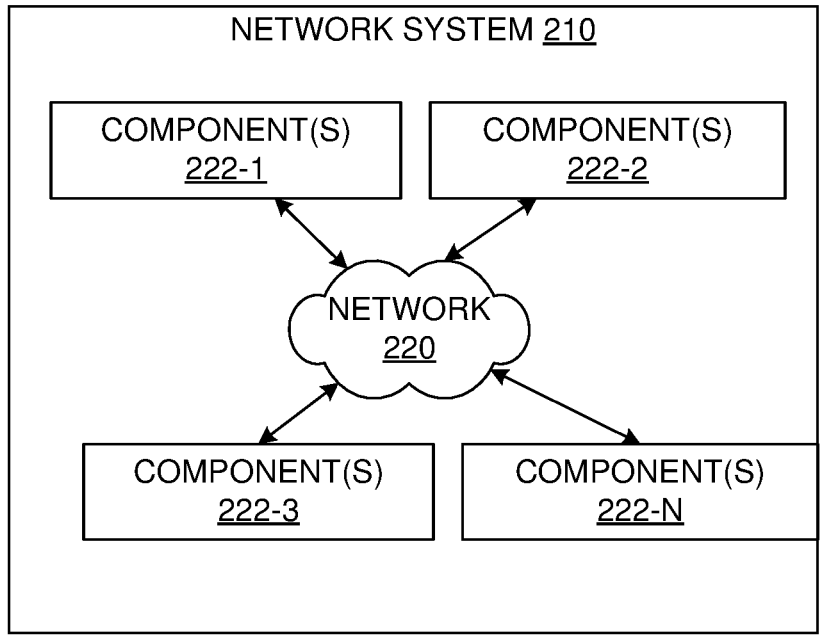

FIG. 2 shows components of an example computing system 200 and an example networked system 210 with a network 220. The system 200 includes one or more processors 202, memory and/or storage components 204, one or more input and/or output devices 206 and a bus 208. In an example embodiment, instructions may be stored in one or more computer-readable media (e.g., memory/storage components 204). Such instructions may be read by one or more processors (e.g., the processor(s) 202) via a communication bus (e.g., the bus 208), which may be wired or wireless. The one or more processors may execute such instructions to implement (wholly or in part) one or more attributes (e.g., as part of a method). A user may view output from and interact with a process via an I/O device (e.g., the device 206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 210. The network system 210 includes components 222-1, 222-2, 222-3, . . . 222-N. For example, the components 222-1 may include the processor(s) 202 while the component(s) 222-3 may include memory accessible by the processor(s) 202. Further, the component(s) 222-2 may include an I/O device for display and optionally interaction with a method. A network 220 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, Bluetooth, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. A mobile device may be configured as a cell phone, a tablet, etc. A method may be implemented (e.g., wholly or in part) using a mobile device. A system may include one or more mobile devices.

A system 200 or 210 may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

Information may be input from a display (e.g., consider a touchscreen), output to a display or both. As an example, information may be output to a projector, a laser device, a printer, etc. such that the information may be viewed. Information may be output stereographically or holographically to a printer, such as a 2D or a 3D printer. As an example, a 3D printer may include one or more substances that can be output to construct a 3D object.

Figure 3:
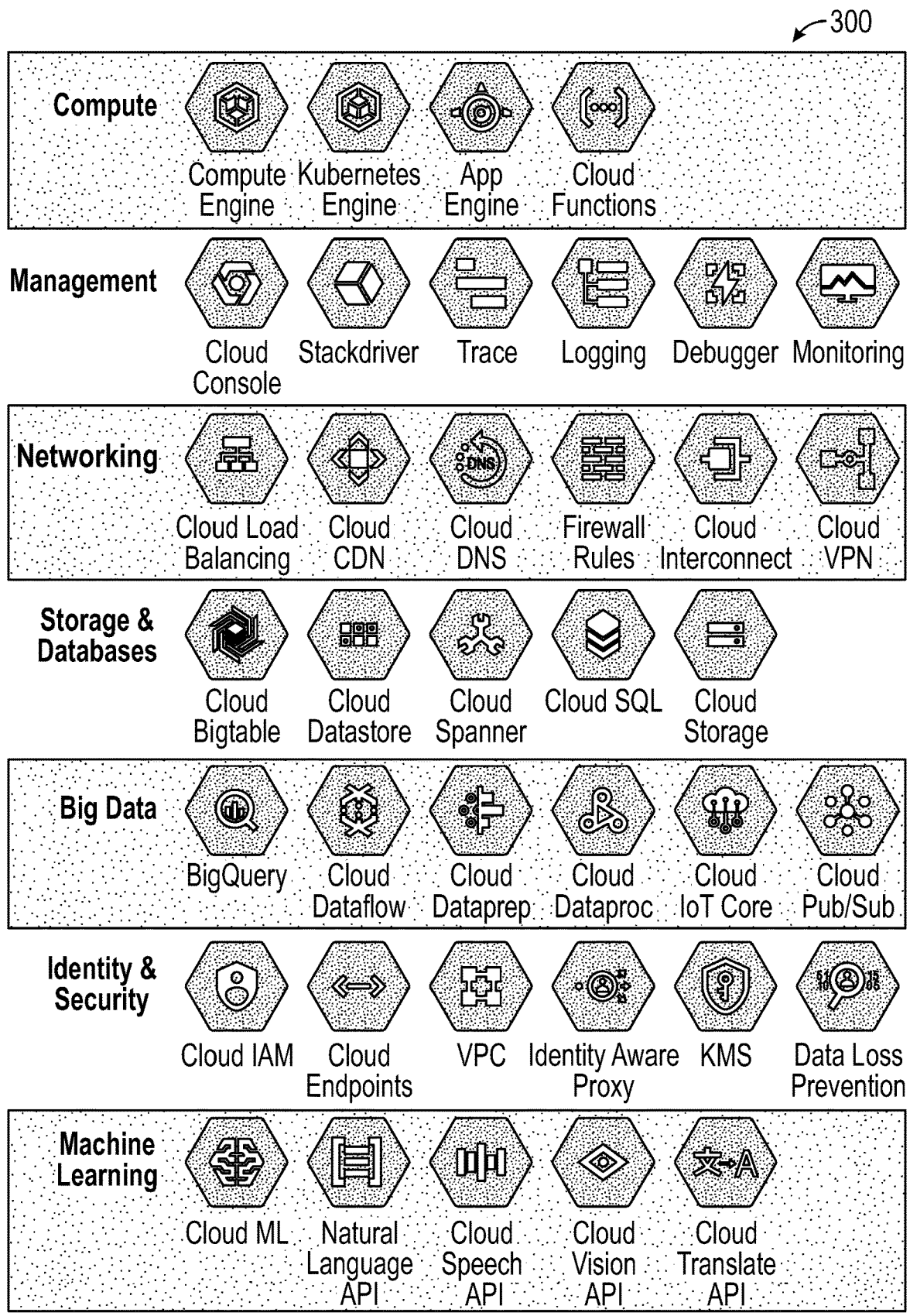
FIG. 3 illustrates an example of a system that can be at least in part cloud-based.

FIG. 3 shows an example of a system 300 that can be at least in part cloud-based. For example, the system 300 can be part of a cloud-based platform or cloud platform. As shown, the system 300 includes compute tools, management tools, networking tools, storage and database tools, large data tools, identity and security tools, and machine learning tools. As shown, the identity and security tools can include a key management service (KMS) tool. Key management can provide for management of cryptographic keys in a cryptosystem, which can include task associated with the generation, exchange, storage, use, crypto-shredding (destruction) and replacement of keys. It can include cryptographic protocol design, key servers, user procedures, and other relevant protocols. As an example, the system 300 can include features of one or more cloud platforms (e.g., GOOGLE cloud, AMAZON WEB SERVICES cloud, AZURE cloud, etc.).

In the GOOGLE cloud platform, when an application requests private data, the request may be authorized by an authenticated entity that has access to the data, which can be part of an OAuth 2.0 flow. In various instances where an application does not demand access to data, a system may utilize a server-centric OAuth 2.0 flow based on a service account. OAuth 2.0 is an industry-standard protocol for authorization. OAuth 2.0 provides specific authorization flows for web applications, desktop applications, mobile phones, living room devices, etc.

A request an application sends to a cloud storage JAVASCRIPT object notation (JSON) API that demands authorization may identify the application to the cloud platform, which may occur in using an OAuth 2.0 token (which also authorizes the request) and/or using the application's API key.

If a request demands authorization (such as a request for private data), then the application may provide an OAuth 2.0 token with the request. The application may also provide the API key. If a request does not demand authorization (e.g., a request for public data), then no identification may be demanded. However, the application may still provide the API key, an OAuth 2.0 token, or both. An application in the GOOGLE Cloud platform may use OAuth 2.0 to authorize requests. OAuth 2.0 provides for tokens and token management, including, for example, token introspection (see, e.g., RFC 7662) to determine the active state and meta-information of a token, token revocation (see, e.g., RFC 7009) to signal that a previously obtained token is no longer needed, and JSON Web Token (JWT) (see, e.g., RFC 7519).

The token introspection extension defines a mechanism for resource servers to obtain information about access tokens. With this specification, resource servers can check the validity of access tokens and find out other information, such as which user and which scopes are associated with the token.

The token revocation extension defines a mechanism for clients to indicate to the authorization server that an access token is no longer needed. This can be used to enable a "log out" feature in clients, allowing the authorization server to clean up security credentials associated with the authorization.

JWT may provide a way to encode claims in a JSON document and/or object that is then signed. JWTs can be used as OAuth 2.0 Bearer Tokens to encode relevant parts of an access token into the access token itself instead of having to store them in a database.

Self-encoded tokens can provide a way to not store tokens in a database by encoding information in the token string itself. In such an example, an API server may be able to verify access tokens without doing a database lookup on each API request, making the API more scalable.

Figure 4:
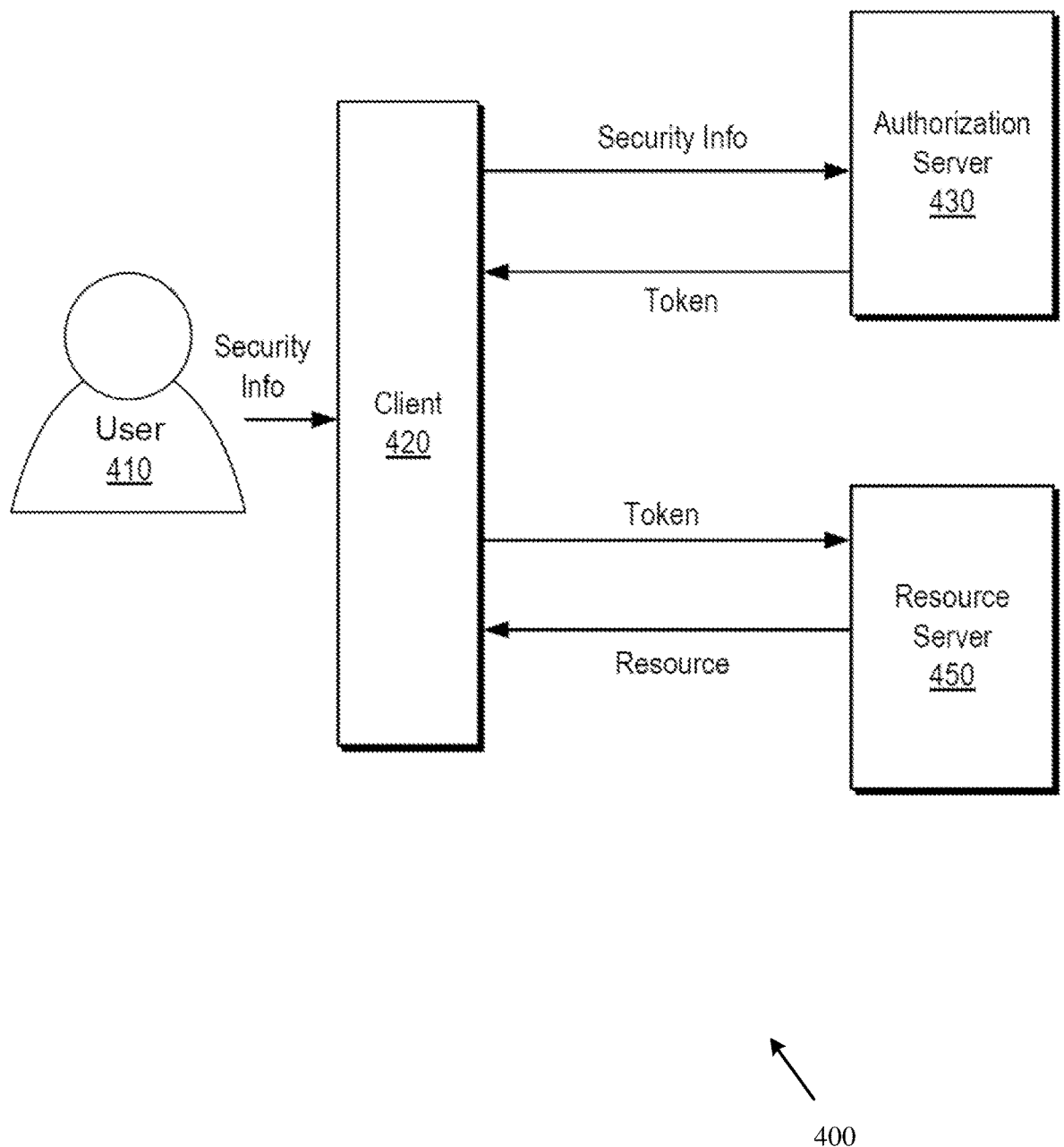
FIG. 4 shows an example of a system that includes a user, a client device, an authorization server, and a resource server.

FIG. 4 shows an example of a system 400 that includes a user 410, a client device 420, an authorization server 430 and a resource server 450. As shown, the client 420 can receive and/or generate security information associated with the user 410. For example, consider the user 410 entering a password via a keyboard, a touch-screen, etc., or, for example, a biometric reader, a dongle, etc. As shown, the security information can be transmitted to the authorization server 430 where, if authorization occurs, the authorization server 430 may return a token, which in the example of FIG. 4 is directed back to the client device 420. The client device 420 may then transmit the token to the resource server 450, where the resource server 450 can trust that the token indicates that the user 410 can properly access one or more resources of the resource server 450, which can, for example, be provided to the client device 420.

Token-based authentication can be part of a protocol that allows users to verify their identity and, in return, receive an access token. During the life of the token, a user may access a website, an app, a service, etc., that the token has been issued for, rather than having to re-enter credentials each time the user requests one or more resources (e.g., the same webpage, app, resource protected via the token, etc.).

An authorization token may operate akin to a stamped ticket. As an example, a user can retain access as long as the token remains valid. Once a user logs out or quits a service (e.g., a software application, etc.), the token can be invalidated. Token-based authentication may differ from traditional password-based or server-based authentication techniques. In various instances, tokens offer an additional layer of security where one or more administrators may have control over each action and transaction.

A password approach may involve user generation, wherein a user creates a password as a combination of letters, numbers, and symbols and the user is responsible for maintaining the password (e.g., on paper, in the brain, in a storage device, a file, etc.). In various instances, a password has to be entered and re-entered as a user demands access. Passwords can demand server authentication when trying to access a resource on a server. In such an example, each time a user logs on, a record of a transaction can be recorded, where memory demand (e.g., memory load) can increase accordingly.

In a token authorization approach, a service may be accessed for the purpose of verifying a request. When verification occurs (e.g., authentication of a password, etc.), the service (e.g., a server based service) may issue a token as a response to the request. In such an approach, a user may still have a password to remember, but the token offers another form of access that can be more secure in that it can be more complex (e.g., longer, formatted, rule-based, etc.). In such an example, a session record does not demand recordation such that memory space can be conserved on a server.

Authorization tokens are generally intended to allow access. However, different types of authorization tokens can operate differently. For example, a connected authorization token may involve keys, discs, drives, and other physical items that plug into the system for access. In such an example, a universal serial bus (USB) device or smartcard can be utilized to log into a system via a connected token. In a contactless system, a device may be positioned close enough to a server to communicate with it, but the device does not plug into the server (e.g., "magic ring" type of token). In a disconnected token, a device can communicate with a server across long distances, without "touching" another device. For example, consider a phone-based two-factor authentication (TFA) process that utilizes a disconnected token. Two-factor authentication can be considered a type of multi-factor authentication (MFA). In the foregoing examples, a user commences the process. For example, a user enters a password, answers a question, runs a finger across a fingerprint reader, etc. However, ultimate access demands an access token.

In various token-based authentication systems, a user may verify credentials once and, in return, the user gets a token that allows access for a time period. For example, a user asks for access to a server or protected resource, which may involve a login with a password or may involve some other process. In response, a verification process commences, wherein a server determines that the user may have access, which may involve checking the password against the username or may involve another process. In such an example, the server may communicate with an authentication device, like a ring, key, phone, or similar device. After verification, the server can issue a token and pass the issued token to the user. As an example, a token may be stored associated with a user's browser while work continues. In such an example, if the user attempts to visit a different part of the server, the token can be communicated with the server again, where access may be granted or denied based on the token. In various instances, an administrator may set one or more limits on a token. For example, a one-use token may be immediately destroyed when a user logs out or a token may be set to self-destruct at the end of a specified time period.

Token-based authentication may be programmed using one or more programming languages, such as the JWT. As users may be accessing systems via mobile devices and web applications, a developer may program a secure way to authenticate that is appropriate for such platforms. JWTs offer an approach, which is an open standard approach. A finished programming product may allow for safe, secure communication between two parties. Data can be verified with a digital signature, and, if it is sent via hypertext transfer protocol (HTTP), encryption may be utilized to help keep the data secure.

A JWT approach includes: i) a header that defines token type and the signing algorithm involved in this space; ii) a payload that defines the token issuer, the expiration of the token, and one or more other aspects; and iii) a signature that verifies that the message has not changed in transit with a secure signature. In a JWT approach, coding may tie these pieces together. JWTs can be signed using a secret (with the key-hash method authentication code (HMAC) algorithm) or a public/private key pair using Rivest-Shamir-Adleman (RSA) algorithm or Elliptic Curve Digital Signature Algorithm (ECDSA). JWTs may also be encrypted to provide secrecy between parties.

JWTs may be utilized for one or more purposes, which may include authorization and information exchange (e.g., securely transmitting information between parties). For example, as JWTs may be signed (e.g., using public/private key pairs), receivers can be assured that the senders are verified. Additionally, as a signature may be calculated using the header and the payload, it is possible to verify that the content has integrity (e.g., not been tampered with).

Other examples of "claims" for JWTs may include registered claim names. For example, an "iss" (Issuer) claim identifies the principal that issued the JWT-processing of this claim is generally application specific where its use can be optional. A "sub" (subject) claim identifies the principal that is the subject of the JWT, where such claims are normally statements about the subject and where a subject value may be locally unique in the context of the issuer or be globally unique, and where its use may be optional. An "aud" (Audience) claim identifies the recipients for whom the JWT is intended, where each principal intended to process the JWT may identify itself with a value in the audience claim and where, if the principal processing the claim does not identify itself with a value in the "aud" claim when this claim is present, then the JWT may be rejected (use is optional). An "exp" (Expiration Time) claim identifies the expiration time on or after which the JWT is to not be accepted for processing, where an "exp" claim is to have a current date/time that is to be before the expiration date/time listed in the "exp" claim. Other types of supported claims include "not before", "issued at", "JWT ID", public claim names, private claim names, and the like.

A JSON Web Token (JWT) is a compact, URL-safe means of representing claims to be transferred between two parties. The claims in a JWT can be encoded as a JSON object that may be used as, for example, the payload of a JSON Web Signature (JWS) structure or as the plaintext of a JSON Web Encryption (JWE) structure, enabling the claims to be digitally signed or integrity protected with a Message Authentication Code (MAC) and/or encrypted.

One or more JWTs may be created and/or validated using one or more approaches where particular features are included. One or more types of approaches may be utilized for implementation of JWTs. For example, an application might demand support for encrypted JWTs and/or nested JWTs, while another might demand support for signing JWTs with the ECDSA using the P-256 curve and the SHA-256 hash algorithm (ES256). A uniform resource name (URN) may be utilized such as "urn: ietf: params: oauth: token-type: jwt" for use by applications that declare content types using uniform resource identifiers (URIs) (rather than, for instance, media types) to indicate that the content referred to is a JWT. In various instances, a JWT may include privacy-sensitive information. In such instances, as an example, an encrypted JWT may be utilized and/or authentication of a recipient and/or transmission using protocols utilizing encryption that support endpoint authentication (e.g., Transport Layer Security (TLS)); noting that an approach may omit privacy-sensitive information from a JWT to minimize one or more privacy types of issues.

While JWTs are mentioned above as examples of types of tokens, a token may be generated and/or used via utilization of one or more approaches. For example, Security Assertion Markup Language (SAML) 2.0 [OASIS.saml-core-2.0-os] provides a standard for creating security tokens with greater expressivity and more security options than may be supported by JWTs. SAML's use of XML [W3C.CR-xml11-20060816] and XML Digital Signature (DSIG) [RFC3275] contributes to the size of SAML Assertions and use of XML and particularly XML Canonicalization [W3C.REC-xml-c14n-20010315] can contribute to their complexity.

JWTs are intended to provide a relatively simple security token format that is small enough to fit into HTTP headers and query arguments in URIs, which is via use of the JSON [RFC7159] object encoding syntax. JWTs also support securing tokens using Message Authentication Codes (MACs) and digital signatures (e.g., using a smaller (and less flexible) format than XML DSIG).

For Simple Web Tokens (SWTs), both JWTs and SWTs, at their core, enable sets of claims to be communicated between applications. For SWTs, both the claim names and claim values are strings. For JWTs, while claim names are strings, claim values can be of one or more JSON type. Both token types offer cryptographic protection of their content: SWTs with HMAC SHA-256 and JWTs with a choice of algorithms, including signature, MAC, and encryption algorithms.

SWTs provide a format for transmitting an assertion between two parties where the assertion is a set of name/value pairs that have been HTML form-encoded and the resulting string is asserted by a SHA 256 HMAC using a key shared between the parties (e.g., for tamper protection). As an example, a SWT may be issued to include the following types of information:

Issuer=issuer.example.com
ExpiresOn=Jan. 1, 2021, Midnight
com.example.group=gold
over18=true In the foregoing example, Issuer and ExpiresOn are reserved names. The attribute com.example.group may be an agreed-upon definition of the syntax and semantics of a group created by the owner of the example.com domain. The "over18" may be a privately-defined attribute settled on between the producer and the consumer of the SWT. The foregoing example can be encoded into HTML form.

As to reserved names, consider an audience name that identifies the SWT audience for which the SWT is intended to be used, wherein the intent is that, if a SWT consumer receives a SWT with an audience value that does not identify the SWT audience, then the SWT may be rejected. As to public and private names, a SWT producer may use a reverse DNS name or a URI to define additional attributes (public names) and a producer and consumer of a SWT may agree on an attribute name that is not a reserved or a public name. Such names are not to be in the list of reserved names. Unlike public names, such private names can be subject to collision.

A token may be of a particular size for passing between two entities, may be generated by one or more devices, and may be controlled, for example, as to what may be accessed, how long permission lasts, what can be performed while logged on, and the like. Authorization tokens may be utilized for various types of temporary access scenarios (e.g., a user base that may fluctuate based on the date, the time, an event, etc.). Authorization tokens may be useful where granting and rescinding access repeatedly is demanding on resources, time, etc. A token-based approach may provide for granting access based on one or more types of properties, which may include user properties and/or other properties (e.g., data properties, etc.).

One or more secure communication protocols may be utilized for token processes, such as, for example, HTTPS connections and/or another encryption. As an example, a token-based system may perform one or more types of test or quality assurance procedures. For example, execution of periodic token tests may be executed to ensure that a system is secure and functioning properly and, if an issue exists, a notification may be generated to call for intervention (e.g., human and/or machine).

A type of token may be selected for a particular task, workflow, etc. For example, in some instances, a JWT approach may be utilized, while in other instances, another token-based approach may be utilized. For example, in some instances, a JWT approach may or may not be suitable for secure sessions.

Figure 5:
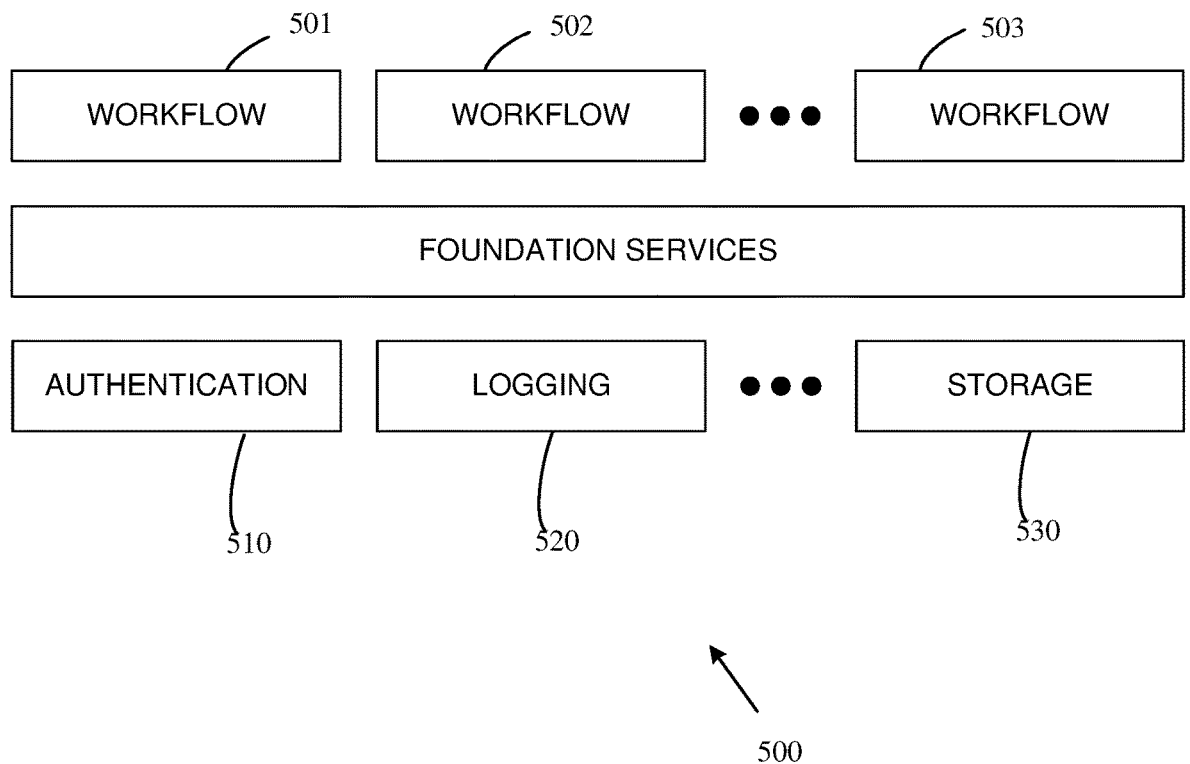
FIG. 5 illustrates an example of an architecture that may include a cloud platform that provides resources for execution of workflows.

FIG. 5 shows an example of an architecture 500 that may include a cloud platform that provides resources for execution of workflows 501-503. Such resources can include tools, such as one or more of those shown in FIG. 3. As an example, a system may provide for managing the identities of the users and/or devices within a cloud platform where, for example, a centralized authentication system 510 may be provided that can implement one or more types of single-sign-on processes (e.g., logging 520). For example, in a single-sign-on based on OAuth 2.0, SAML, JWT, or the like, the system may provide for identifying users and/or devices and collaboration between workflows. As an example, users may collaborate in a manner where users may access a framework or frameworks to perform one or more collaborative workflows.

As an example, in order to retain a security boundary within a workflow, an authentication token can be issued to a workflow that requested it (e.g., a requesting device). In such an example, when workflow A wants to access workflow B, workflow A requests another token targeted to workflow B. For example, consider redirecting a user device browser to workflow B and then logging 520 into workflow B, which will redirect the user back to workflow A to continue. In such an approach, actions can be complex and demand collaboration between both workflow A and workflow B. Moreover, in a REST API scenario, there is no browser to be redirected such that the foregoing approach cannot be used. In many cases for the REST API, a service account is used when workflow A is calling workflow B and, if workflow B is to act on a user's behalf, the user's token is passed along as well. Thus, workflow A stores the credential(s) for that service account in storage 530 and switches to that or those credential(s) when calling workflow B. Workflow B maintains which service accounts are trusted and which are not. As an example, consider if there are hundreds of workflows that are to call workflow B. In such an example, workflow B is expected to maintain a relatively long list and keep that list updated.

On a cloud platform itself, as such trust relationships are managed locally (e.g., by workflow B itself in the foregoing example), the cloud platform is unaware of dependencies between workflows. As such, the cloud platform does not have a way to manage desired workflow interactions properly.

As describe herein, a central authorization system (CAS) can be utilized to manage trust relationships. A CAS may include various features for generic authorization, for example, because each workflow might manage an authorization model in a different way. Thus, a CAS can be flexible and extensible.

As an example, rather than storing a trust relationship in a called-upon workflow (e.g., a secondary workflow, a tertiary workflow, etc.), a trust relationship can be stored in a CAS. Such an approach can be useful to gain visibility of dependencies between workflows, which may provide for enhanced management (e.g., quality control, risk control, auditing, etc.).

As an example, one or more components of a CAS may provide for generating an audit trail that may be in the form of a block chain. For example, consider a cache that can store information as to calls, responses, decisions, etc. In such an example, one or more types of information may be stored in the form of a block chain (or blockchain). As an example, a block chain can be a growing list of records (e.g., blocks) that are linked using cryptography. In such an example, each block can include a cryptographic hash of the previous block, a timestamp, and transaction data (e.g., a Merkle tree, etc.). As an example, a cache can include various cache management features that may, for example, provide for cache insertions, deletions, etc., and audit trail generation.

As mentioned, a CAS can be flexible and extensible to satisfy various different authorization models that each workflow might adopt. As an example, a framework, a system, a cloud platform, etc., can utilize a Representational State Transfer (REST) API, which may be of a style that defines a set of constraints to be used for creating web services. Web services that conform to the REST architectural style, termed RESTful web services, provide interoperability between computer systems on the Internet, a cloud platform, etc. RESTful web services can allow one or more requesting systems to access and manipulate textual representations of web resources by using a uniform and predefined set of stateless operations. As an example, one or more other kinds of web services may be utilized (e.g., such as SOAP web services) that may expose their own sets of operations.

As an example, an HTTP-based RESTful API may be defined with the following aspects: a base URI, such as http://api.example.com/; a standard HTTP method (e.g., GET, POST, PUT, and DELETE); a media type that defines state transition data elements (e.g., Atom, microformats, application/vnd.collection+json, etc.). A current representation can tell a client how to compose requests for transitions to next available application states, which may be via a URI, a JAVA applet, etc.

RESTful implementations can make use of one or more standards, such as, for example, HTTP, URI, JSON, and XML. As an example, an API may be referred to as being RESTful, though it may not fulfil each architectural constraint (e.g., uniform interface constraint, etc.).

Figure 6:
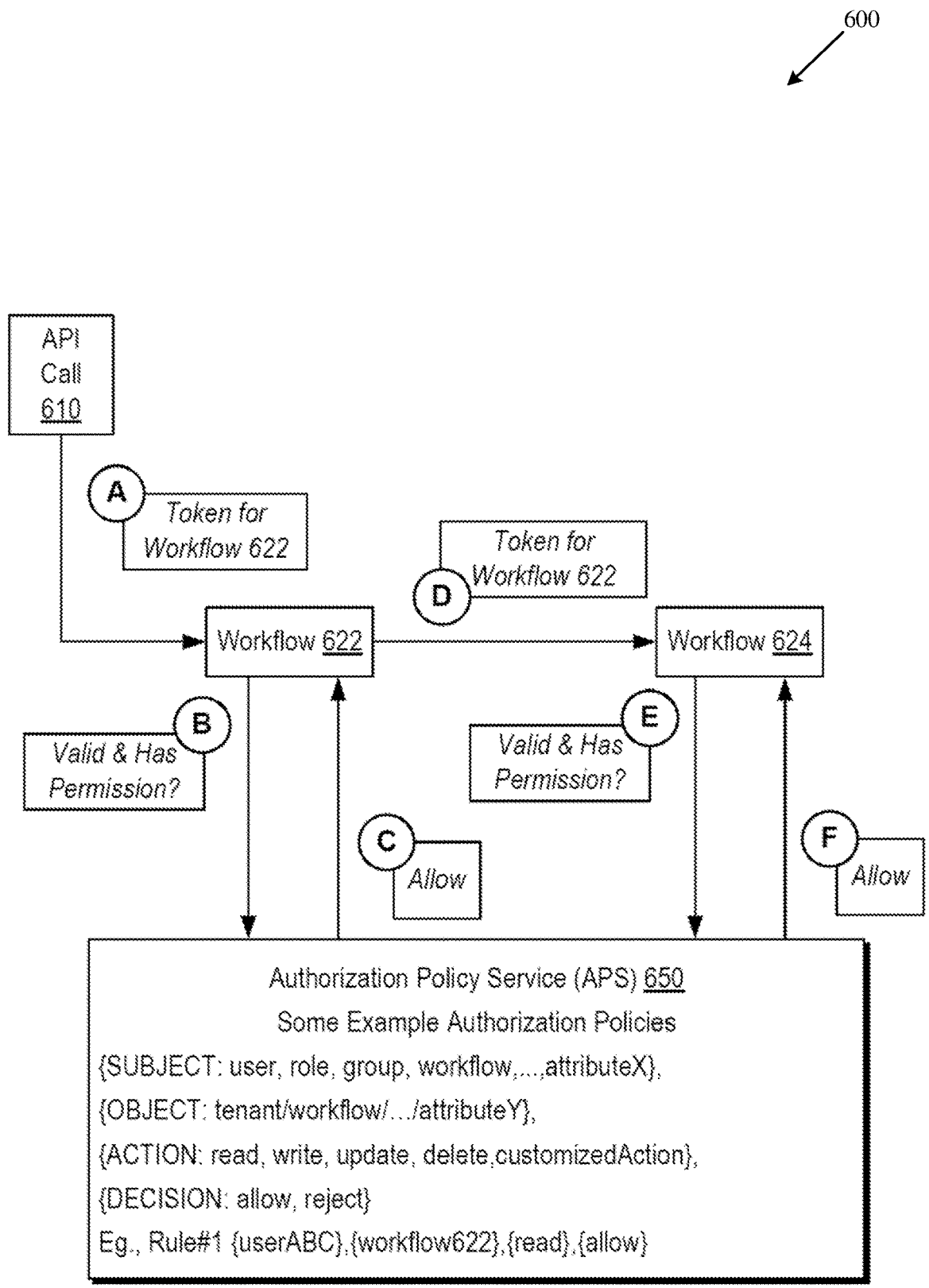
FIG. 6 illustrates an example of a system that provides for multiworkflow authorization.

FIG. 6 shows an example of a system 600 that includes an application programming interface (API) call 610 (e.g., an API caller), a workflow 622, a workflow 624 and an authorization policy service (APS) 650, which may be part of a central authorization system (CAS). As shown, the system 600 includes various actions, labeled A to F. In action A, a token for the workflow 622 is provided. In action B, the APS 650 is consulted to determine whether the token for the workflow 622 is valid and that a user/device has permission. In action C, according to decision making and/or analysis of the APS 650, verification occurs such that the workflow 622 is allowed. In action D, the token for workflow 622 is provided to the workflow 624. In action E, the APS 650 is consulted to determine whether the token for the workflow 622 is valid and that a user/device has permission for utilization of the workflow 624. In action F, according to decision making and/or analysis of the APS 650, verification occurs such that the workflow 624 is allowed. Note that in the system 600, the workflow 622 interacts with the workflow 624, where trust is demanded by both of the workflows 622 and 624. However, as explained, a single token can be utilized.

In the example of FIG. 6, consider an API caller 610 that calls a REST API in the workflow 622, providing the token issued for the API caller, which may be part of a standardized procedure. In the example of FIG. 6, when the workflow 622 receives the token, it can check the token using a CAS (e.g., the APS 650, etc.) to verify the token, for example, to determine whether it is valid. The workflow 622, via the CAS (e.g., the APS 650, etc.) may also check to determine whether there exists one or more rules to allow the owner of the token to access workflow 622. In such an example, when the checks pass, the workflow 622 can accept the token and perform one or more tasks that may be part of a user's job.

As shown in the example of FIG. 6, however, while the workflow 622 is performing the one or more tasks, it may demand information from the workflow 624, which may be accessed, for example, via a REST API in the workflow 624. To gain proper access, the workflow 622 passes the token it has received (see action A) to the REST API endpoint in the workflow 624. The workflow 624 can then check the token using the CAS (e.g., the APS 650, etc.) to determine whether the token is valid and, for example, if there are one or more rules to allow the owner of the token access the workflow 624. For example, the CAS can access a rules database that can include rules logic, etc., to determine whether one or more rules exist that allow a token issued to workflow 622 to be accepted by workflow 624.

When the CAS (e.g., the APS 650, etc.) determines that conditions are met for proper access to the workflow 624 by the workflow 622 using the token, then the CAS can indicate that the token is valid or otherwise allowed such that the workflow 622 can have the workflow 624 perform one or more actions in the workflow interactive process. For example, the workflow 624 may be performed by a specialized framework that performs computations, accesses one or more databases, executes one or more machine learning models, etc., to generate information that can be utilized by the workflow 622. In such an example, an API call may be made that can include a variety of information, data structures, etc., which may include a token as validated by an initiating workflow making the API call. In such an example, where the receiving workflow validates the token, it may then respond to the API call, for example, by returning requested information. In turn, the initiating workflow can utilize the requested information to generate information that may be part of the API call 610. In such an example, separate resources, which may be separate frameworks, can interact using a single token.

In the example of FIG. 6, the workflow 622 does not need to switch its identity when calling the workflow 624. Rather, the trust basis for the workflow 622 may be utilized, given appropriate management as provided by a CAS (e.g., the APS 650, etc.). From a perspective of the workflow 624, it does check if the token passed to it has access or not, which occurs rather than checking against a self-implemented authorization component. In the example of FIG. 6, the CAS (e.g., a managed authorization server) gives the workflow 624 the same functionality without a difference. In the example of FIG. 6, the workflow 624 can operate without maintaining its own authorization server. From an overall cloud platform point of view, the authorization relationships can be managed via a centralized component (e.g., a CAS). In such an approach, visibility can be provided through actions performed by the centralized component. As an example, one or more security procedures may be implemented using a CAS to reduce risk of permission over granting, security misconfiguration, etc.

In the example of FIG. 6, the workflow 624 can provide a token of its own to the APS 650, for example, to assure the APS 650 that it can trust the workflow 624. For example, if the APS 650 denies access to the workflow 624, then the workflow 624 cannot present the token for the workflow 622 to the APS 650 as the workflow 622 may not be trusted. In such an example, authorization determination as to the token of the workflow 624 for access to the APS 650 may be relatively lightweight and expeditious. Where the token of the workflow 622 is presented by the workflow 624 to the APS 650, there can be additional checking for making a decision (e.g., according to one or more policies, rules, etc.). In such an example, the workflow 624 can have a token that is not associated with a user, etc., but rather with the workflow 624, which can be a framework, etc.

As an example, the workflow 622 can include its own token and have to perform an authorization process with respect to the APS 650 as explained with respect to the workflow 624. A framework may be instantiated on a server, etc., where the server can present a credential for purposes of token generation for purposes of authorizing the framework for interactions with the APS 650. As an example, one or more processes may utilize an OAuth 2.0, etc., process.

In an example embodiment, one or more devices may include one or more types of security circuitry. For example, consider a trusted platform module (TPM), etc., which may include one or more keys, a random number generator, etc. A token may provide for consent for use of a framework and/or return of results from use of the framework.

Figure 7:
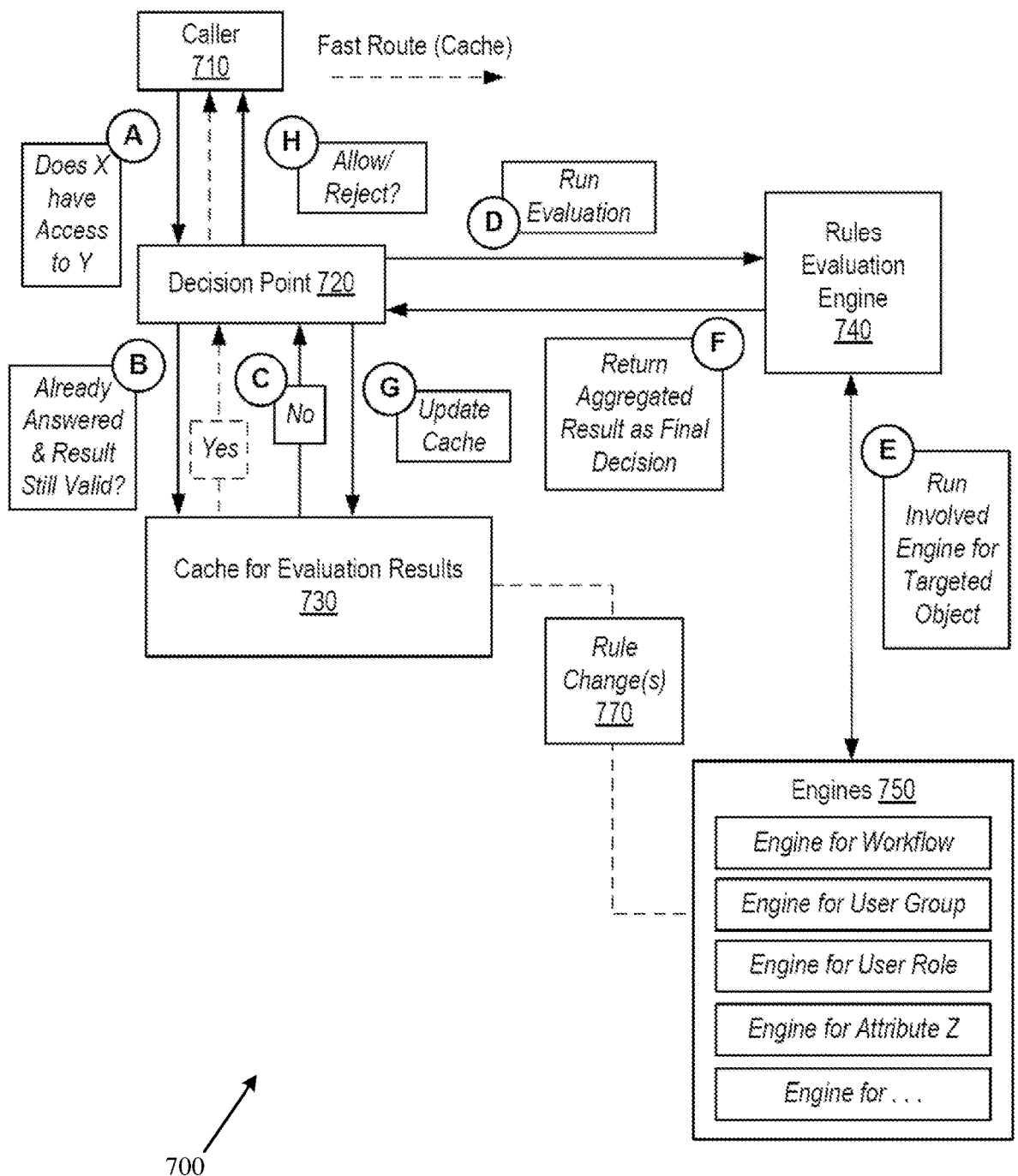
FIG. 7 illustrates an example of a system.

FIG. 7 shows an example of a system 700 that includes a caller 710, a decision point 720, a cache for evaluation results 730, a rules evaluation engine 740 and various engines 750 for purposes of rules evaluation. In the example of FIG. 7, various actions are shown and described using labels A to G. Action A may be a query from the caller 710 to the decision point 720, such as, "does X have access to Y". Action B may be a query from the decision point 720 to the cache 730, such as, "has the query already been answered and is the result still valid". In the example of FIG. 7, dashed lines illustrate a so-called fast route where answers are "Yes" such that the decision point 720 can respond to the caller 710 with a valid or allowed type of response.

However, in the example of FIG. 7, various actions labeled C to H pertain to a "No" as action C to the queries of action B. As shown, where the decision point 720 receives a "No" from the cache 730, the decision point 720 can, per action D, request running of an evaluation by the rules evaluation engine 740. As indicated by action E, the rules evaluation engine 740 can run one or more of the engines 750 for a targeted object. In the example of FIG. 7, the engines 750 may include engines for workflows, engines for user groups, engines for user roles, engines for attributes, etc. As shown, the rules evaluation engine 740 can, per action F, return an aggregated result as a final decision to the decision point 720 where such a result can, per action G, be utilized to update the cache 730 and, per action H, provide for an allow or a reject to the caller 710.

As shown in the example of FIG. 7, a rule change(s) component 770 may be utilized, for example, to provide for a linkage between the cache 730 and the engines 750. For example, if a change occurs to a rule in a rule engine, that change may impact the information stored in the cache 730. If a decision is made that such a change does impact information stored in the cache 730, then the cache 730 may purge such information and/or otherwise mark and/or tag such information. For example, consider a tag that causes action B to inform the decision point 720 to perform action D. In such an example, the action of the cache 730 may be other than "No", which may be useful when performing quality control, an audit, etc. Where the action is other than "No", it may be recorded as part of an audit trail that can be confirmed by the rule change(s) component 770 that indicates that the action of the rule change(s) component 770 has been effectuated.

In such an example, upon the performance of the action D, the rule change(s) component 770 may be informed such that a loop can be closed for the rule change. Where a loop remains open for a period of time, the rule change(s) component 770 may issue a notification that may call for intervention to determine if there may have been an issue with cache notification, the rule change itself, etc. Consider a rule change that may be associated with taking a framework (e.g., a framework for a workflow, etc.) offline such that a particular workflow is deprecated. In such an example, it may be that the particular workflow is not called as its underlying framework is not available (e.g., replaced by another feature, etc.). The rule change(s) component 770 may inform a caller 710 via the decision point 720 with yet another type of answer, such as, for example, "resource no longer available". In such an example, resources may be conserved as the caller 710 can be provided with relevant information without having to run an evaluation via the rules evaluation engine 740.

As explained, a cache 730 can be utilized for one or more purposes where, for example, a rule change(s) component 770 may be operatively coupled to the cache 730 and one or more of the engines 750. In various instances, a data structure in the cache 730 can appear as a prior data structure with appended information as may be provided by the rule change(s) component 770. In such an example, a system may be improved where decision making as to trust and/or workflow availability is enhanced. Such an approach may decrease time and provide for faster workflow interactions where multiple workflows are to be utilized to perform a job.

For example, consider a model building workflow that requests computational results of a simulation workflow and/or a data acquisition workflow. In such an example, a single token may provide an ability for use of the model building workflow and calls to the simulation workflow and/or the data acquisition workflow by the model building workflow. Such an approach may be relatively seamless from the experience of a user. For example, without a CAS, the model building workflow may stop once it requests information from the simulation workflow. If a user is not monitoring the model building workflow, nothing may happen, and time can be lost. Through use of a CAS, the interactive workflows can operate in an autonomous manner, for example, until a non-trust related query, stopping point, etc., occurs. In other words, through chaining of trust by a CAS, a user may be assured that issues of trust are not likely to arise when performing a job that demands workflow interactions between a plurality of workflows.

One or more types of rules may be dependent on time, location, utilization, etc. For example, consider a work schedule in a workplace that dictates one or more rule timings. A key structure can be utilized for a cache such that items in the cache can be relatively quickly selected. For example, where a rule change is to impact a cache, the cache can be structured using keys (e.g., keywords, etc.) to identify the cache entries that can be filtered as pertaining to a rule change, which as mentioned, may be via a rule change(s) component, etc.

As described herein, when an authorization decision is desired a workflow can call a decision point in a CAS (e.g., a server, etc.). In such an example, the decision point 720 can check if an authorization decision is available in cache 730 where, if affirmative, the decision point can return the decision result. As explained, such an approach can be a fast route via use of the cache, which can reduce turnaround time. Such an approach can be beneficial where workload demands as to authorization requests are high A decision will not be updated until a cache entry has expired. Thus, in various instances, cache expiration time may be tailored, which may depend on workload demands. For example, consider a workload based cache expiration time component that can shorten expiration time where workload is low and can increase expiration time where workload is higher (e.g., up to a maximum). In such an example, the cache 730 may come into existence (e.g., and various associated operations) once authorization workload exceeds a certain level such that user experiences are not overly impacted by delays from trust related communications, computations, etc.

Where a decision is not available in the cache 730 (see, e.g., the action C "No", which may be a general type of "No" or may be specific for various types of reasons why the cache 730 is inadequate, etc.), the decision point 720 can call the rules evaluation engine 740 to provide a result (e.g., a final decision). As explained, when the rule evaluation engine 740 receives a request, it can select the rules that are related with a targeted object. In such an example, for each rule, the rule evaluation engine 740 can call the corresponding rule evaluating engine from the engines 750, pass the appropriate parameters, and receive an evaluation result. As an example, the rule evaluation engine 740 can aggregate results to generate a final decision. As shown, the rule evaluation engine 740 can return a final decision for the requested evaluation to the decision point 720. As shown, after the decision point 720 receives the result, it can store it to the cache 730 for future use and the decision point 720 can return a decision to the caller 710, which can be a workflow.

As explained, the system 600 and the system 700 can address complexity in implementing a workflow, when a workflow calls another workflow(s). Such an approach can be implemented using cloud-based resources and/or other resources. For example, a CAS may be a separate server or may be a cloud-based server. A CAS provides enhanced visibility for the relationships between workflows. A CAS can provide for improved quality control, auditing, etc., which may be part of a larger process that aims to identify and address inefficiencies. For example, consider a small feature in one framework being called by another framework using a REST API approach where the two frameworks may demand two different subscriptions, etc. In such an example, it may be more efficient to replicate the small feature in the calling framework such that the calling framework can perform tasks without resorting to a call to the other framework. While such a solution may allow for bypassing a CAS, it can be a result of operation of a CAS (e.g., as may be indicated via audit trails, etc.).

A system can utilize a centralized authorization process while still providing sufficient flexibility to each workflow running on a cloud platform (or cloud platforms). As an example, a CAS may be a supplement for one or more types of authentication protocols (e.g., OAuth 2.0, SAML, etc.). A CAS approach can reduce complexity when implementing authorization and may reduce errors, waiting time, etc. Also, a CAS can generate data that can be informative as to usage patterns without introducing additional costs. A cache feature can be part of a CAS that helps to expedite trust relations for access to resources where the information in the cache can be indicative of user behaviors, framework behaviors, etc. Thus, a cache may be multipurpose in that it can expedite workflows and in that it can be an independent source of information as to how workflows interact, timings of interactions, etc.

A system may provide for collaboration of members of a group. One or more rule engines may provide for analysis of group rules. For example, consider a rule as to user X1 and user X2 where a rule demands that both user X1 and user X2 are logged into an environment, which may be for one or more particular frameworks. Each user may present a corresponding token for actions where the tokens can provide for access to another framework according to a rule using one or both of the tokens. As an example, a rule may pertain to proprietary data where a service provider and a customer of the service provider are each logged, such that a token of the service provider can be utilized to access a resource such as a database of the customer to access a particular portion of the proprietary data (e.g., which may be restricted).

A system may utilize geolocating for a rule. For example, consider an address of a caller that can be determined and/or geospatial coordinates (e.g., via a mobile device, etc.). In such an example, a determined spatial location of a caller may be transmitted to a rules engine, etc., utilized by a cache for a query, etc. One service may be local, and another service may be remote. For example, consider an on-premises framework and a cloud framework. As an example, a CAS (e.g., or an APS) can be implemented in a local and/or a remote manner. One or more workflows can be for controlling one or more field operations. In such an example, expedited interaction of workflows via improved authorization as may be provided by a CAS can improve control (e.g., real-time control, etc.).

Figure 8:
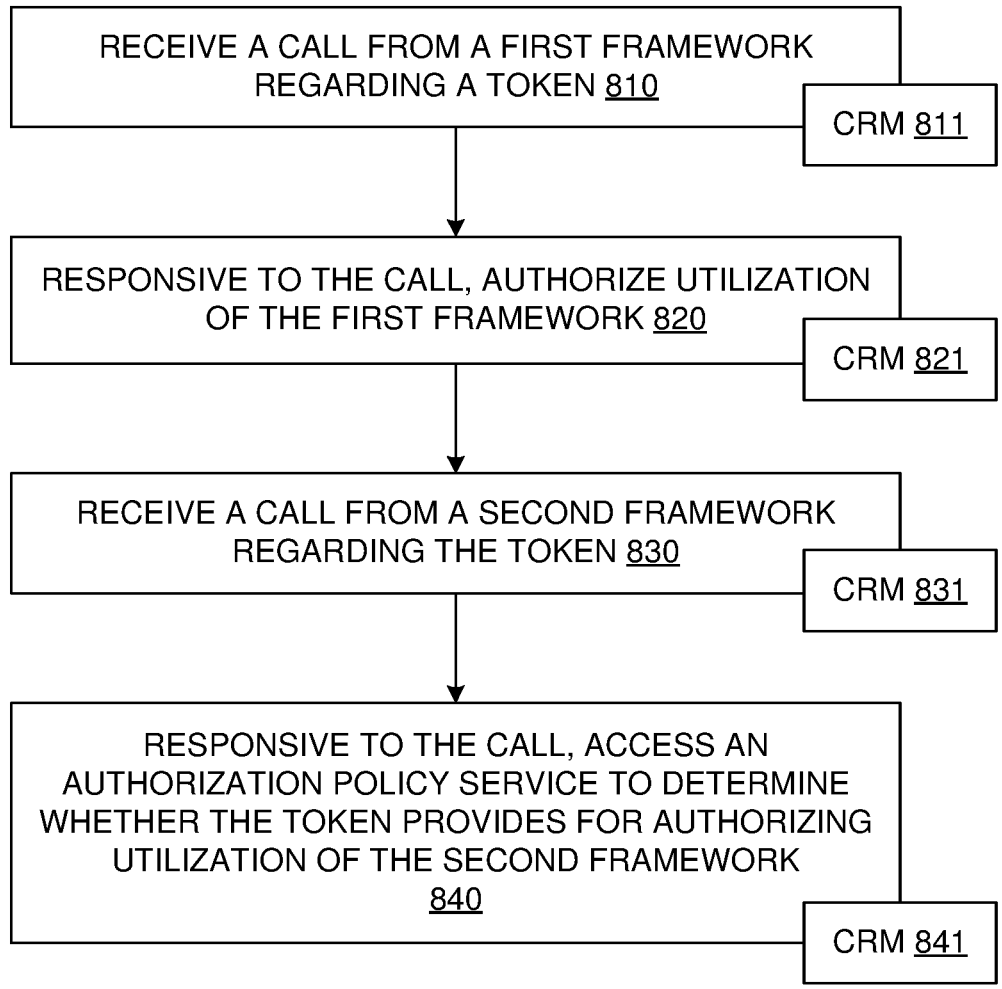
FIG. 8 illustrates an example of a method.

FIG. 8 shows an example of a method 800 that includes i) a reception block 810 for receiving a call from a first framework regarding a token, ii) an authorization block 820, responsive to the call, for authorizing utilization of the first framework, iii) a reception block 830 for receiving a call from a second framework regarding the token, and iv) an access block 840, responsive to the call, for accessing an authorization policy service to determine whether the token provides for authorizing utilization of the second framework. In such an example, the authorization policy service can include a rules evaluation engine that generates a rule-based decision for a token; and a cache that stores rule-based decision information for the token.

The method 800 is shown in FIG. 8 in association with various computer-readable media (CRM) blocks 811, 821, 831 and 841. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1700. A computer-readable medium (CRM) may be a computer-readable storage medium that is non-transitory and that is not a carrier wave. One or more of the blocks 811, 821, 831 and 841 may be in the form of processor-executable instructions.

A system can include a rules evaluation engine that generates a rule-based decision for a service token and a cache that stores rule-based decision information for service tokens. In such an example, the service token can be associated with a computational framework utilized for performing one or more workflows. A rule-based decision for a service token can be for a first token of a first service regarding use of the first token for access to a second service. A system can include a decision point component that includes an interface (e.g., a network interface). In such an example, the interface can be or can include an API. The API may receive calls via one or more networks and can respond to such calls. As an example, an API can be a REST API.

A decision point component may be operatively coupled to a cache and operatively coupled to a rules evaluation engine. The decision point component can call the rules evaluation engine responsive to receipt of a non-authorization response from the cache and does not call the rules evaluation engine responsive to receipt of an authorization response from the cache. In such an example, at least the cache may be enabled responsive to an authorization workload exceeding an authorization workload level. A cache may include one or more time limits where the time limits may be adjustable depending on a level of an authorization workload. As an example, a token can be time limited and/or a cache can be time limited.

A system can include a rule change component that is operatively coupled to a rules evaluation engine and operatively coupled to a cache. The rule change component can issue a command to the cache responsive to a rule change of a rule of the rules evaluation engine. A cache can include queryable data structures. For example, consider queryable data structures that depend on rule-based decisions of the rules evaluation engine (e.g., that include at least some information derived from rule-based decisions, etc.).

Data structures stored in cache can include time information that pertains to validity of a plurality of tokens. At least some of the data structures can indicate that one of the plurality of tokens is for a first service and usable for access to a second service.

A method can include: i) receiving a call from a first framework regarding a token; ii) responsive to the call, authorizing utilization of the first framework, iii) receiving a call from a second framework regarding the token and, iv) responsive to the call, accessing an authorization policy service to determine whether the token provides for authorizing utilization of the second framework. Such a method can include determining that the token provides for authorizing utilization of the second framework and returning information to the first framework responsive to authorized utilization of the second framework. A method can include using an authorization policy service that includes a rules evaluation engine that generates a rule-based decision for a token and a cache that stores rule-based decision information for the token.

A computer program product can include one or more computer-readable storage media that can include processor-executable instructions to instruct a computing system to perform one or more methods and/or one or more portions of a method.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A central authorization system comprising:
   one or more processors;
   memory coupled with the one or more processors;
   a first set of application programming interfaces (APIs) stored in the memory, the first set of APIs configured to receive authorization requests from a plurality of frameworks that execute workflows, wherein each framework includes a respective set of libraries having a respective second set of APIs, and the respective set of libraries are stored in the memory;
   an authorization policy server coupled with the memory and configured to:
   receive, from a first framework of the plurality of frameworks, a first authorization request for access to a service by a first workflow, the first authorization request including a token associated with the first workflow,
   generate, from a rules evaluation engine, a rule-based decision for the token,
   store, in a cache, rule-based decision information for the token, wherein the cache is configured to become enabled in response to an authorization workload exceeding an authorization workload level, wherein the cache includes a first time limit that is adjustable based on the authorization workload level,
   receive, from a second framework of the plurality of frameworks, a second authorization request for access to the service by a second workflow, the second authorization request including the token associated with the first workflow, and
   determine whether to authorize the second framework to access the service based at least in part on the token associated with the first workflow of the first framework; and
   a decision point component coupled to the cache and to the rules evaluation engine, the decision point component comprising one of the first set of APIs, wherein the decision point component is configured to communicate with the rules evaluation engine in response to receipt of a non-authorization response from the cache and refrain from communicating with the rules evaluation engine in response to receipt of an authorization response from the cache.

2. The central authorization system of claim 1, wherein the token is time limited.

3. The central authorization system of claim 2, further comprising a rule change component coupled to the rules evaluation engine and to the cache.

4. The central authorization system of claim 3, wherein the rule change component is configured to issue a command to the cache in response to a change of a rule of the rules evaluation engine.

5. The central authorization system of claim 4, wherein the cache includes a first queryable data structure.

6. The central authorization system of claim 5, wherein the first queryable data structure is configured to depend on a rule-based decision of the rules evaluation engine.

7. The central authorization system of claim 6, wherein a first data structure stored in the cache includes time information that pertains to validity of a plurality of tokens.

8. A method comprising:
   receiving, by an authorization policy server of a central authorization system and from a first framework, a first authorization request for access to a service by a first workflow, the first authorization request including a token associated with the first workflow, wherein the first framework includes a first set of libraries having a first set of APIs, and the first set of libraries are stored in a first memory;
   generate, from a rules evaluation engine of the authorization policy server, a rule-based decision for the token;
   store, in a cache of the authorization policy server, rule-based decision information for the token, wherein the cache is configured to become enabled in response to an authorization workload exceeding an authorization workload level, wherein the cache includes a first time limit that is adjustable based on the authorization workload level;
   in response to the first authorization request, authorizing access of the first framework associated with the first workflow to the service;
   receiving, by the authorization policy server and from a second framework, a second authorization request for access to the service by a second workflow, the second authorization request including the token associated with the first workflow, wherein the second framework includes a second set of libraries having a second set of APIs, and the second set of libraries are stored in a second memory;

in response to the second authorization request, determining whether to authorize the second framework to access the service based at least in part on the token associated with the first workflow of the first framework; and communicate, via a decision point component coupled to the cache and to the rules evaluation engine, the decision point component comprising one of the first set of APIs, with the rules evaluation engine in response to receipt of a non-authorization response from the cache and refrain from communicating with the rules evaluation engine in response to receipt of an authorization response from the cache.

9. The method of claim 8, wherein determining whether to authorize the second framework to access the service includes accessing an authorization policy service to determine whether to authorize utilization of the second framework.

10. The method of claim 8, further comprising:
determining that the second framework is authorized to access the service based at least in part on the token associated with the first workflow of the first framework; and
returning information to the first framework responsive to the authorizing the second framework to access the service.

* * * * *